United States Patent Office 3,705,897
Patented Dec. 12, 1972

3,705,897
METHOD FOR CONVERTING Δ² CEPHALOSPORIN TO Δ³ CEPHALOSPORIN
Charles F. Murphy, Indianapolis, Ind., assignor to Eli Lilly and Company, Indianapolis, Ind.
No Drawing. Filed July 7, 1970, Ser. No. 53,017
Int. Cl. C07d 99/24
U.S. Cl. 260—243 C     7 Claims

ABSTRACT OF THE DISCLOSURE

A 3-halomethyl Δ² cephalosporin is isomerized to the corresponding 3-halomethyl Δ³ cephalosporin by oxidation of the Δ² compound to the sulfoxide, isomerization of the double bond from the 2- to the 3-position by treatment with a tertiary amine, and reduction of the sulfoxide to the sulfide. These 3-halomethyl Δ³ cephalosporins are readily converted to 3-functionalizedmethyl Δ³ cephalosporins, especially to the 3-alkylthiomethyl Δ³ cephalosporins.

BACKGROUND OF THE INVENTION

The first member of the cephalosporin family of antibiotics to be discovered was cephalosporin C which is obtained by a fermentation process and contains an acetoxymethyl group in the 3-position of the ring. Morin and Jackson then described in U.S. Pat. 3,275,626 a method for the conversion of a penicillin to a 3-methyl cephalosporin. It was recognized that functionalization of this 3-methyl group offered a means to obtain cephalosporin antibiotics of varied biological activity.

One approach to the functionalization of the methyl group proceeds through the halogenation of this group. A 3-methyl Δ² cephalosporin is converted to the corresponding 3-halomethyl Δ² cephalosporin by treatment with a halogenating agent such as N-bromosuccinimide. However, the Δ³ cephalosporins exhibit greater biological activity than do the Δ² cephalosporins so it is necessary to effect an isomerization of the 3-halomethyl Δ² cephalosporin to a 3-halomethyl Δ³ cephalosporin. One method of effecting this isomerization involves the hydrolysis of the 3-halomethyl Δ² cephalosporin to the corresponding 3-hydroxymethyl Δ² cephalosporin, oxidation of the 3-hydroxymethyl Δ² cephalosporin to effect isomerization and form the 3-hydroxymethyl Δ³ cephalosporin sulfoxide, and treatment of this sulfoxide with phosphorus tribromide to effect reduction of the sulfoxide to the sulfide and simultaneously replace the hydroxyl group with bromine to give the desired 3-bromomethyl Δ³ cephalosporin. This compound may then be reacted with a nucleophile to give a 3-functionalizedmethyl Δ³ cephalosporin.

SUMMARY

I have now discovered a more direct, less cumbersome method for the isomerization of a 3-halomethyl Δ² cephalosporin to the corresponding 3-halomethyl Δ³ cephalosporin. In accordnace with my method the 3-halomethyl Δ² cephalosporin is oxidized to the sulfoxide at which time partial isomerization occurs, isomerization of the double bond is completed by treatment with a tertiary amine, and the sulfoxide is reduced to the sulfide, giving the desired 3-halomethyl Δ³ cephalosporin.

DESCRIPTION OF THE PREFERRED EMBODIMENT

The starting material for my process is a 3-halomethyl Δ² cephalosporin having the formula

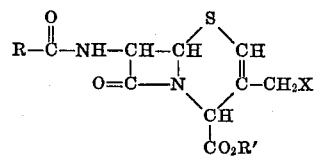

wherein

X is chlorine, bromine, or iodine;
R is $C_1$–$C_6$ alkyl, $$Z-CH-\atop Y$$

or $$Z-(CH_2)_m-A-(CH_2)_n-$$

Z is thienly, furyl, or

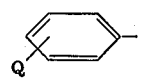

Y is protected hydroxyl or protected amino;
A is oxygen, sulfur, or a carbon to carbon bond;
m is an integer of 0 to 4;
n is an integer of 1 to 4;
Q is hydrogen, fluorine, chlorine, bromine, $C_1$–$C_6$ alkyl, $C_1$–$C_2$ alkoxy, nitro, cyano, hydroxy, or trifluoromethyl; and
R' is hydrogen, $C_1$–$C_6$ alkyl, halo $C_1$–$C_6$ alkyl, $C_3$–$C_8$ alkenyl, $C_3$–$C_8$ alkynyl, benzyl, methoxybenzyl, nitrobenzyl, benzhydryl, trityl, phthalimidomethyl, succinimidomethyl, phenacyl, or trimethylsilyl;

The product from the reaction is changed only in that the double bond of the ring has been shifted from the 2- to the 3-position.

Since these compounds are primarily useful as intermediates in the preparation of 3-functionalizedmethyl cephalosporins, X is preferably bromine. The bromides are readily prepared and are sufficiently reactive with nucleophilic agents to give good yields of the desired 3-functionalizedmethyl compounds.

In the above formula R represents the residue of an acyl group forming an amide with the 7-amino group. The 3-halomethyl cephalosporin is obtained from a 3-methyl cephalosporin which in turn is preferably prepared by the ring expansion of a penicillin as described in Morin and Jackson U.S. Pat. 3,275,626. Therefore, the acyl group present in the 3-halomethyl cephalosporin is preferably an acyl group found in penicillins. Hundreds of such groups are known in the prior art and many are described for example in U.S. Pats. 2,941,995, 2,951,839, 2,985,-648, 2,996,501, 3,007,920, 3,028,379, 3,040,032, 3,040,-033, 3,041,332, 3,041,333, 3,071,575, 3,079,305, 3,080,-356, 3,093,547, 3,117,119, 3,120,513, 3,127,394, 3,134,-767, 3,142,673, 3,174,964, 3,180,863, 3,202,654, and 3,210,337. With the present state of technology it is also possible to remove the acyl group after the rearrangement and reacylate the 7-amino cephalosporin with a different acyl group.

Thus, it is apparent to those skilled in the art that the values for R given in the above formula are merely representative and are not intended as an exhaustive list of such groups. Equivalent acceptable groups are known to those skilled in the art.

The main requirement of the acyl group is that it not contain a functional group susceptible to oxidation. That is why Y is described as a protected hydroxyl or protected amino group. The protection of hydroxyl and amino groups is well known to those skilled in the art. Hydroxyl groups are generally protected by the formation of an ester such as the formate, the acetate, or the trichloroacetate. Amino groups are protected by conversion to a carboxamide such as the acetamide or the chloroacetamide or by substitution with a group such as trichloroethoxy carbonyl, t-butoxycarbonyl, or benzyloxycarbonyl groups. Amines are also protected by formation of enamines such as by reaction with methyl acetoacetate. The manner in which the hydroxyl or amino group is protected is not important to my process.

Typical examples of suitable R groups include methyl, t-butyl, benzyl, α-formyloxybenzyl, α-(N-trichloroethoxycarbonyl)aminobenzyl, phenoxymethyl, phenylthiomethyl, p-nitrobenzyl, α-(N-benzyloxycarbonyl)amino-m-hydroxybenzyl, 2-thienylmethyl, 3-furylethyl, o-fluorophenoxyethyl, p-methoxybenzyl, and p-trifluoromethylphenylpropyl. Preferred R groups are benzyl and phenoxymethyl.

While the carboxyl group in the 4-position may be present as the free acid, it is common practice in organic chemistry to protect carboxyl groups during chemical reactions by the formation of esters. Since it is usually desired to regenerate the free acid at the completion of the reaction, the most commonly used ester forming groups are those that are easily removed such as the benzyl, p-nitrobenzyl, t-butyl, benzhydryl, phenacyl, or trichloroethyl esters. Other ester groups as defined in the above formula may also be employed.

The method for effecting this isomerization of the double bond is a three-step method involving:

(a) oxidizing the 3-halomethyl Δ² cephalosporin to the sulfoxide and simultaneously partially isomerizing the double bond to the 3-position;
(b) completing the isomerization of the double bond of the sulfoxide by treating with a tertiary amine having a pKa of less than about 5.1; and
(c) reducing the 3-halomethyl Δ³ cephalosporin sulfoxide to the desired 3-halomethyl Δ³ cephalosporin.

The first step in my isomerization process is the oxidation of the 3-halomethyl Δ² cephalosporin to the sulfoxide. This oxidation may be accomplished as described by Cocker et al., J. Chem. Soc. 1966, pages 1142 to 1151. A preferred method of oxidation is that of Cooper wherein the cephalosporin is treated at a temperature within the range of −50° to +100° C. with at least one equivalent of an oxidizing agent selected from the class consisting of inorganic peracids having a reduction potential of at least +1.5 volts and containing only nonmetallic elements, organic carboxylic peracids, and mixtures of hydrogen peroxide and an acid having a dissociation constant of at least $10^{-5}$. Examples of suitable oxidizing agents include periodic acid, persulfuric acid, m-chloroperbezoic acid, peracetic acid, trifluoroperacetic acid, performic acid, permaleic acid, and mixtures of hydrogen perioxide with acetic acid, perchloric acid or trifluoroacetic acid.

When an organic carboxylic peracid is used, it may be added as such or may be generated to situ by the use of at least an equivalent of hydrogen peroxide and a carboxylic acid. It is often desirable to use a large excess of the carboxylic acid as, for example, when acetic acid is used as the solvent. Oxidations with carboxylic peracids are catalyzed by an acid having a dissociation constant of at least $10^{-5}$. The stronger of the acid, the more effective it is as a catalyst. Oxidations may also be conducted employing hydrogen peroxide with a catalytic amount of an acid having a dissociation constant of at least $10^{-5}$.

This oxidation results not only in the conversion of the cephalosporin to the cephalosporin sulfoxide, but also results in some isomerization of the double bond from the 2- to the 3-position. The isomerization that occurs is a relatively small amount and the oxidation step alone is not sufficient to give a practical conversion of Δ² to Δ³ compound.

As the second step in my process, the product from the oxidation reaction is treated with about one mole of a tertiary amine having a pKa of less than about 5.1. This treatment with the amine results in substantially complete conversion of the Δ2 cephalosporin to the corresponding Δ³ cephalosporin. Thus, the product from this step of the reaction is the 3-halomethyl Δ³ cephalosporin sulfoxide. Suitable amines include pyrimidine, dimethylbenzylamine, diethylbenzylamine, and N,N-dimethylaniline. Stronger amines can probably be used if they are highly hindered.

The final step of the process involves the reduction of the 3-hlomethyl Δ³ cephalosporin sulfoxide to the desired 3-halomethyl Δ³ cephalosporin by treatment with a suitable reducing agent. A process for the reduction of Δ³ cephalosporin sulfoxide is described in detail in Murphy et al. copending application Ser. No. 764,925 filed October 3, 1968 now United States Pat. No. 3,641,014.

The reduction process as there described involves the treatment of the sulfoxide with:

(1) a reducing agent selected from the group consisting of:
(i) hydrogen in the presence of a hydrogenation catalyst;
(ii) stannous, ferrous, cuprous or manganous cations;
(iii) dithionite, iodide, or ferrocyanide anions;
(iv) trivalent phosphorous compounds having a molecular weight below about 500;
(v) halosilane compounds of the formula

wherein X is chlorine, bromine, or iodine and each of $R^2$ and $R^3$ is hydrogen, chlorine, bromine, iodine, or a $C_1$–$C_8$ hydrocarbon radical free from aliphatic unsaturation; and
(vi) a chloromethylene iminium chloride of the formula

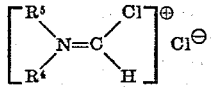

wherein each of $R^4$ and $R^5$ taken separately is $C_1$–$C_3$ alkyl, or taken together with the nitrogen to which they are attached form a monocyclic heterocyclic ring having from 5 to 6 ring forming atoms and a total of 4 to 8 carbon atoms; and
(2) an activating agent which is
(i) an acid halide of an acid of carbon, sulfur or phosphorus, which acid halide is inert to reduction by the reducing agent, and which acid halide has a second order hydrolysis constant equal to or greater than that of benzoyl chloride; or
(ii) a cyclic sultone of the formula

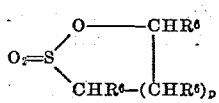

wherein p is 0 or 1 and each $R^6$ separately is hydrogen or $C_1$–$C_3$ alkyl with not more than one such $R^6$ being $C_1$–$C_3$ alkyl, in a substantially anhydrous liquid medium at a temperature of from about −20° C. to about 100° C. If the reducing agent is selected from classes (iv) through (vi) the activating agent (2) may be omitted from the reaction mixture.

The first class of reducing agents comprises hydrogen used in a typical hydrogenation reaction. A noble metal catalyst such as paladium, platinum, rhodium, or a compound thereof, and particularly the oxides, is employed in this hydrogenation reaction. This catalyst may be in the form of a finely divided solid or may be supported on a commonly used carrier such as carbon or barium sulfate. Catalytic hydrogenation reactions are well known to those skilled in the art.

Stannous, ferrous, cuprous, or manganous cations comprise the second class of reducing agents. These cations are used in the form of inorganic or organic compounds or complexes which are at least partially soluble in the liquid medium. Suitable examples of such compounds include stannous chloride, stannous fluoride, stannous acetate, stannous formate, ferrous chloride, ferrous oxalate, ferrous succinate, cuprous chloride, cuprous benzoate, cuprous oxide, manganous chloride, manganous acetate, manganous oxide, and the like, as well as such cations provided in the form of complexes with known chelating agents such as ethylenediaminetetraacetic acid, nitrilotriacetic acid, and the like.

The third class of reducing agents is comprised of dithionite, iodide, or ferrocyanide anions used in the form of various inorganic or organic salts or complexes which provide the anion to the reaction medium. A few examples of useful compounds containing these anions are the alkali metal dithionites, iodides or ferrocyanides, particularly the sodium and potassium salts. In addition, the anions may be used in the form of the acid such as hydroiodic acid or ferrocyanic acid.

The fourth class of reducing agents is comprised of trivalent phosphorus compounds having a molecular weight below about 500. These compounds may be inorganic or organic and include such as phosphines, phosphinite esters, phosphonite esters, phosphite esters, or mixtures of trivalent phosphoruscarbon, phosphorus-oxygen, or phosphorus-sulfur bonds, as well as inorganic trivalent phosphorus halides and amides and trivalent phosphorus compounds containing one or two phosphorus-halogen bonds with the remaining phosphorus bonds being satisfied by organic radicals as defined above. Examples of suitable trivalent phosphorus compounds include triphenyl phosphite, trimethyl phosphite, triethyl phosphite, tricresyl phosphite, phenyl dimethyl phosphite, tolyl dihexyl phosphite, diphenyl phenylphosphonite, dihexyl phenylphosphonite, methyl diphenylphosphinite, xylyl dipropylphosphinite, triphenylphosphine, trimethylphosphine, tris(2-chloroethyl) phosphite, bis(2-chloroethyl) phenylphosphonite, N,N',N''-hexamethylphosphoramidite, phosphorus trichloride, phosphorus tribromide, phosphorus triiodide, phenyl phosphorodichloridite, and the like.

In general, trivalent phosphorus compounds having halogen bonded to the phosphorus will reduce the cephalosporin sulfoxide without the external activator.

Halosilanes, and preferably those having molecular weights below about 500, comprise the fifth class of reducing agents. These compounds can also be used with or without the external activating agent. Suitable halosilanes include chlorosilane, bromosilane, iodosilane, silicon tribromide, silicon dichloride, diphenyl chlorosilane, diethyl iodosilane, cresyl chlorosilane, hexyl chlorosilane, isopropyl dibromosilane, and the like.

The sixth class of reducing agents is comprised of chloromethylene iminium chlorides. These compounds may be prepared in situ in the reaction mixture by reacting an appropriate formamide with a chlorinating agent. For example, by adding dimethylformamide and an equimolar amount of a chlorinating agent such as oxalyl chloride, phosphorus oxychloride, or thionyl chloride to the reaction mixture containing the $\Delta^3$ cephalosporin sulfoxide there is formed chloromethylene N,N-dimethyliminium chloride which reduces the $\Delta^3$ cephalosporin sulfoxide to the corresponding $\Delta^3$ cephalosporin. Examples of other suitable chloromethylene iminium chlorides include chloromethylene N,N-diethyliminium chloride, chloromethylene N-pyrrolidiniminium chloride, chloromethylene N-piperidiniminium chloride, and the like. The bromine analogues of such compounds may also be prepared and used in a similar manner if desired. These halomethylene iminium halides may be used without the external activating agent.

The activating agent (2) to be used in the process is an acid halide or cyclic sultone as described above. The acid halide should be one that has a second order hydrolysis constant value in 90 percent acetone and water solution at least as great as that of benzoyl chloride, as described by Beck and Ugi, Chem. Ber. 94, 1839 (1961). Examples of suitable acid halides include phosgene, carbonyl dibromide, oxalyl chloride, acetyl chloride, acetyl bromide, hexanoyl chloride, octanoyl bromide, thionyl chloride, thionyl bromide, methanesulfonyl chloride, phosphorus oxychloride, phosphorus oxybromide and the halogenated trivalent phosphorus compounds named under reducing agents, for example, phosphorus trichloride and methyl phosphorodichloridite. Suitable sultones include propanesultone, 1,3-butanesultone, ethanesultone, 1,3-hexanesultone, and the like.

For the reduction step of my process I prefer to use the phosphorus trihalide without an external activator. The phosphorus trihalide used should be the trihalide corresponding to the halogen present in the 3-halomethyl $\Delta^3$ cephalosporin sulfoxide to avoid the possibility of halogen exchange.

The 3-halomethyl $\Delta^3$ cephalosporin product from my process is useful as an intermediate in preparing 3-functionalized-methyl $\Delta^3$ cephalosporins having antibiotic activity. The halogen can be replaced with a nucleophilic group in accordance with known procedures. For example, reaction of the 3-halomethyl $\Delta^3$ cephalosporin with a mercaptan results in the formation of the corresponding 3-thiomethyl $\Delta^3$ cephalosporin.

It will be apparent to those skilled in the art that while I have described a particular sequence of steps whereby a 3-halomethyl $\Delta^3$ cephalosporin is obtained and then reacted with a nucleophilic reagent to obtain a 3-functionalizedmethyl cephalosporin it is also possible to react the 3-halomethyl $\Delta^3$ cephalosporin sulfoxide with a nucleophilic reagent and then reduce the 3-functionalizedmethyl $\Delta^3$ cephalosporin sulfoxide to obtain the desired 3-functionalizedmethyl cephalosporin. Such a variation is within the spirit of my invention.

The sequence of steps I have described may be carried out in a stepwise fashion with isolation of the product from each step prior to subjecting it to the subsequent steps. However, I have found that the reaction may also be conducted as a "one pot" process wherein the intermediates are not isolated but are directly subjected to treatment by the following reagent. This latter procedure offers certain advantages and is the one I prefer.

My process will be further illustrated by the following examples:

Example 1

To a solution of 80 mmoles of t-butyl 7-phenoxyacetamido-3-bromomethyl-$\Delta^2$-cephem-4-carboxylate in 1 l. of a 1:1 mixture of carbon tetrachloride and methylene chloride at ice temperature is added dropwise a solution of 15.2 g. (80 mmoles) of m-chloroperbenzoic acid in 500 ml. of methylene chloride. After one hour at ice temperature 10 ml. of N,N-dimethylaniline is added and the reaction mixture is stirred for 72 hours at 25° C. A portion of the solvent is evaporated to reduce the volume to 1 l. and the mixture is cooled to −10° C. To this stirred, cold solution is added dropwise a solution of 8 ml. (80 mmoles) of phosphorus tribromide in 500 ml. of methylene chloride. The mixture is stirred in the cold for another 30 minutes after the addition is complete. The reaction mixture is evaporated to dryness and the residue is suspended in a mixture of 500 ml. of ethyl acetate and 500 ml. of ten percent sodium chloride solution. The ethyl acetate layer is successively washed with three percent hydrochloric acid (twice), five percent sodium bicarbonate solution, ten percent sodium chloride solution, dried over sodium sulfate, and evaporated to dryness to give 36.0 g. of crude t-butyl 7-phenoxyacetamido-3-bromomethyl-$\Delta^3$-cephem-4-carboxylate. The product is identical to that obtained by reacting t-butyl 7-phenoxyacetamido-3-hydroxy-methyl-$\Delta^3$-cephem-4-carboxylate with phosphorus tribromide. The structure is further confirmed by reaction with methyl mercaptan to obtain t-butyl 7-phenoxyacetamido-3-methylthiomethyl-$\Delta^3$-cephem-4-carboxylate.

Example 2

To a solution of p-nitrobenzyl 7-phenoxyacetamido-3-bromomethyl - $\Delta^2$ - cephem-4-carboxylate (prepared from 9.96 g. of the 3-methyl compound by treatment with N-bromosuccinimide) in 200 ml. of methylene chloride is added dropwise over a period of eight hours a solution of 4.10 g. of m-chloroperbenzoic acid (90 percent purity) in 500 ml. of methylene chloride at 25° C. The mixture is washed twice with five percent sodium bicarbonate solution, dried over sodium sulfate, and evaporated to dryness. The residue is dissolved in 350 ml. of methylene chloride, 3 ml. of N,N-dimethylaniline is added, and the mixture is stirred 72 hours to promote double bond isomerization. To this $\Delta^3$ sulfoxide cooled to $-10°$ C. is added dropwise with stirring a solution of 2 ml. of phosphorus tribromide in 50 ml. of methylene chloride over a 30-minute period. After another 20 minutes at $-10°$ C. the reaction mixture is evaporated to dryness. The residue is suspended in a mixture of 200 ml. each of ethyl acetate and water and the ethyl acetate layer is separated. The ethyl acetate layer is washed twice with ten percent sodium chloride solution, twice with three percent hydrochloric acid, and once with five percent sodium bicarbonate. After drying over sodium sulfate, the solution is evaporated to dryness to give 8.69 grams of crude product. The dark brown residue is dissolved in 200 ml. of ethyl acetate, heated briefly with 10 g. of charcoal, and filtered. Evaporation of the solution leaves 7.82 g. of p-nitrobenzyl 7-phenoxyacetamido-3-bromomethyl - $\Delta^3$ - cephem-4-carboxylate. The structure is confirmed by nuclear magnetic resonance spectroscopy and reaction with methyl mercaptan to give the corresponding 3-methylthiomethyl compound.

Following the procedure of either Example 1 or Example 2, the following 3-halomethyl-$\Delta^3$-cephalosporins are prepared from the corresponding-$\Delta^2$-cephalosporins.

| R | R' | X |
|---|----|---|
| C₆H₅—CH₂— | —CH₂CCl₃ | Br |
| C₆H₅—CH(NH—CO—O—CH₂—C₆H₅)— | —CH₂—C₆H₅ | Cl |
| CH₃— | —C(CH₃)₂—CH₃ | Cl |
| (furyl)—CH₂— | —CH₂CCl₃ | I |
| C₆H₅—CH(OCHO)— | —CH₂—C₆H₄—NO₂ | Br |
| (thienyl)—CH₂— | H | Br |
| C₆H₅—S—CH₂— | —C(CH₃)₂—CH₃ | Br |
| C₆H₄(OH)—CH(NH—CO—O—CH₂CCl₃)— | —CH₂CCl₃ | Br |
| CH₃O—C₆H₄—CH₂— | —CH₂—C₆H₄—OCH₃ | Br |

Thus, it is apparent that my process is one of general applicability for the isomerization of 3-halomethyl-Δ²-cephalosporins to the corresponding 3-halomethyl-Δ³-cephalosporins. The presence of other substituents in the molecule is not important in my process so long as such substituents do not contain functional groups susceptible to oxidation or reduction under the conditions employed in the process.

I claim:

1. A method for converting a 3-halomethyl-Δ²-cephalosporin having the formula

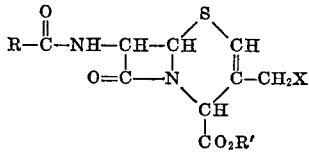

wherein

X is chlorine bromine, or iodine;
R is $C_1$–$C_6$ alkyl,

or

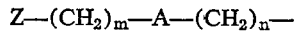

Z is thienyl, furyl, or

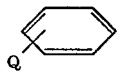

Y is protected hydroxy or protected amino;
A is oxygen, sulfur, or a carbon to carbon bond;
m is an integer of 0 to 4;
n is an integer of 1 to 4;
Q is hydrogen, fluorine, chlorine, bromine, $C_1$–$C_6$ alkyl, $C_1$–$C_2$ alkoxy, nitro, cyano, hydroxy, or trifluoromethyl; and
R' is hydrogen, $C_1$–$C_6$ alkyl, halo $C_1$–$C_6$ alkyl, $C_3$–$C_8$ alkenyl, $C_3$–$C_8$ alkynyl, benzyl, methoxybenzyl, nitrobenzyl, benzhydryl, trityl, phthalimidomethyl, succinimidomethyl, phenacyl, or trimethylsilyl;
to the corresponding 3-halomethyl-Δ³-cephalosporin which comprises:

(a) oxidizing the 3-halomethyl-Δ²-cephalosporin to the sulfoxide and simultaneously partially isomerizing the double bond to the 3-position by treating the 3-halomethyl-Δ²-cephalosporin at a temperature within the range of −50° to +100° C. with at least one equivalent of an oxidizing agent selected from the class consisting of inorganic peracids having a reduction potential of at least +1.5 volts and containing only nonmetallic elements, organic carboxylic peracids, and mixtures of hydrogen peroxide and an acid having a dissociation constant of at least $10^{-5}$;

(b) completing the isomerization of the double bond of the sulfoxide by treating with a tertiary amine having a pKa of less than about 5.1; and (c) reducing the 3-halomethy-Δ³-cephalosporin sulfoxide to the desired 3-halomethyl-Δ³-cephalosporin by treating with:

(1) a reducing agent selected from the group consisting of
(i) hydrogen in the presence of a hydrogenation catalyst;
(ii) stannous, ferrous, cuprous or manganous cations;
(iii) dithionite, iodide, or ferrocyanide anions;
(iv) trivalent phosphorus compounds having a molecular weight below about 500;
(v) halosilane compounds of the formula

wherein X is chlorine, bromine, or iodine and each of $R^2$ and $R^3$ is hydrogen, chlorine, bromine, iodine, or a $C_1$–$C_8$ hydrocarbon radical free from aliphatic unsaturation; and (vi) a chloromethylene iminium chloride of the formula

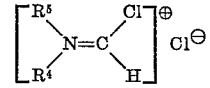

wherein each of $R^4$ and $R^5$ taken separately is $C_1$–$C_3$ alkyl, or taken together with the nitrogen to which they are attached form a monocyclic heterocyclic ring having from 5 to 6 ring forming atoms and a total of 4 to 8 carbon atoms; and (2) an activating agent which is
(i) an acid halide of an acid of carbon, sulfur or phosphorus, which acid halide is inert to reduction by the reducing agent, and which acid halide has a second order hydrolysis constant equal or greater than that of benzoyl chloride; or
(ii) a cyclic sultone of the formula

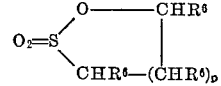

wherein p is 0 or 1 and each $R_6$ separately is hydrogen or $C_1$–$C_3$ alkyl with not more than one such $R_6$ being $C_1$–$C_3$ alkyl,
in a substantially anhydrous liquid medium at a temperature of from about −20° C. to about 100° C.

2. A method as in claim 1 wherein the reducing agent is a phosphorus trihalide and no activating agent is used in the reduction.

3. A method as in claim 2 wherein X is bromine and the phosphorus trihalide is phosphorus tribromide.

4. A method as in claim 1 wherein R is benzyl.

5. A method as in claim 4 wherein X is bromine, the reducing agent is phosphorus tribromide, and no activating agent is used.

6. A method as in claim 1 wherein R is phenoxymethyl.

7. A method as in claim 6 wherein X is bromine, the reducing agent is phosphorus tribromide, and no activating agent is used.

References Cited
UNITED STATES PATENTS

| | | | |
|---|---|---|---|
| 3,507,861 | 4/1970 | Morin et al. | 260—243 C |
| 3,575,969 | 4/1971 | Morin et al. | 260—243 C |
| 3,578,660 | 5/1971 | Cooper | 260—243 C |

NICHOLAS S. RIZZO, Primary Examiner

U.S. Cl. X.R.

424—246